(12) United States Patent
Blackmon et al.

(10) Patent No.: US 6,739,729 B1
(45) Date of Patent: May 25, 2004

(54) COMPOSITE BACKED PRESTRESSED MIRROR FOR SOLAR FACET

(75) Inventors: James Bertram Blackmon, Brownsboro, AL (US); David Lee Dean, New Market, AL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/604,224

(22) Filed: Jun. 27, 2000

(51) Int. Cl.$^7$ ............................ G02B 5/08; G02B 5/10; G02B 7/182
(52) U.S. Cl. ................ 359/846; 359/853; 359/883; 156/84; 156/160; 156/285
(58) Field of Search .................... 359/846, 847, 359/848, 851, 852, 853, 867, 868, 869, 870, 871, 883, 894; 428/332; 65/63, 102, 286, 287; 156/84, 85, 86, 168, 165, 196, 212, 285, 445

(56) References Cited

U.S. PATENT DOCUMENTS

| | | | |
|---|---|---|---|
| 1,285,901 A | * 11/1918 | Bausch et al. | ............. 359/870 |
| 3,382,137 A | 5/1968 | Schreiber et al. | |
| 3,456,134 A | 7/1969 | Ko | |
| 3,466,473 A | 9/1969 | Rhoten | |

(List continued on next page.)

FOREIGN PATENT DOCUMENTS

| | | | | |
|---|---|---|---|---|
| GB | 2 026 284 | | 4/1978 | |
| GB | 2 064 883 | | 11/1979 | |
| GB | 2098349 | * | 11/1982 | ............. 359/853 |
| JP | 0024302 | * | 3/1981 | ............. 359/883 |
| JP | 63192002 | | 9/1988 | |
| JP | 363210801 | * | 9/1988 | ............. 359/883 |
| WO | WO 79/00162 | * | 4/1979 | |

OTHER PUBLICATIONS

Ibong Jung and Yongrae Roh, Design and fabrication of pieoceramic bimorph vibration sensors, Sensors and Actuators A69 (1998) 259–266.

Kloeppel, James E., Residual stress in piezoelectric ceramics can e reduced, put to work, News Bureau, (Sep. 1, 2000).

Face International Corporation, Thunder White Paper (Feb. 21, 2001); pp 1 to 10.

Physics and Media Group, Parasitic Power Harvesting in Shoes (Aug. 1998); pp 1 to 8.

USSN 10/274,577, filed Oct. 21, 2002, entitled: "Multi-Frequency Piezoelectric Energy Harvester".

USSN 10/361,533, filed Feb 10, 2003, entitled "Single Crystal Piezo (SCP) Apparatus And Method of Forming Same".

Primary Examiner—Ricky D. Shafer
(74) Attorney, Agent, or Firm—Harness Dickey & Pierce P.L.C.

(57) ABSTRACT

A glass structure, such as a mirror facet, having a glass member, a composite structure and a support structure. The composite structure includes a rigid interlayer which is bonded to the glass member and exerts a compressive force thereon to place the glass member in compression. The support structure is used to mount the glass structure and prevents the glass member from collapsing due to the compressive force exerted by the rigid interlayer. The glass structure is particularly well adapted for use in forming heliostats, parabolic dishes, trough concentrators, or other like elements for use in solar power systems, and does not suffer from the limitations or prior forms of such devices.

29 Claims, 2 Drawing Sheets

U.S. PATENT DOCUMENTS

| | | | |
|---|---|---|---|
| 3,553,588 A | | 1/1971 | Honig |
| 3,607,584 A | * | 9/1971 | Becht .................. 359/883 |
| 3,624,451 A | | 11/1971 | Gauld |
| 3,912,380 A | * | 10/1975 | Klein ................... 359/848 |
| 3,959,056 A | * | 5/1976 | Caplan |
| 3,985,429 A | * | 10/1976 | Fleischer ............... 359/870 |
| 4,124,277 A | * | 11/1978 | Stang .................. 359/883 |
| 4,239,344 A | * | 12/1980 | Wildenrotter ............ 359/848 |
| 4,253,895 A | * | 3/1981 | Chenault ............... 359/852 |
| 4,337,997 A | * | 7/1982 | Sadoune et al. .......... 359/848 |
| 4,435,043 A | * | 3/1984 | Mertens et al. .......... 359/853 |
| 4,436,373 A | * | 3/1984 | Kirsch ................. 359/853 |
| 4,467,236 A | | 8/1984 | Kolm et al. |
| 4,469,089 A | * | 9/1984 | Sorko-Ram ............. 359/883 |
| 4,510,484 A | | 4/1985 | Snyder |
| 4,678,292 A | | 7/1987 | Miyatani et al. |
| 4,807,969 A | * | 2/1989 | Shimodaira |
| 5,463,374 A | | 10/1995 | Mendez et al. |
| 5,632,841 A | | 5/1997 | Hellbaum et al. |
| 5,751,091 A | | 5/1998 | Takahashi et al. |
| 5,764,415 A | | 6/1998 | Nelson et al. |
| 5,801,475 A | | 9/1998 | Kimura |
| 5,849,125 A | | 12/1998 | Clark |
| 5,956,191 A | | 9/1999 | Blackmon et al. |
| 5,986,791 A | | 11/1999 | Suzuki et al. |
| 5,991,080 A | | 11/1999 | Kohta et al. |
| 6,162,313 A | | 12/2000 | Bansemir et al. |
| 6,306,773 B1 | | 10/2001 | Adas et al. |
| 6,382,026 B1 | | 5/2002 | Tajika et al. |
| 6,407,484 B1 | | 6/2002 | Oliver et al. |
| 6,530,276 B2 | | 3/2003 | Tajika et al. |

\* cited by examiner

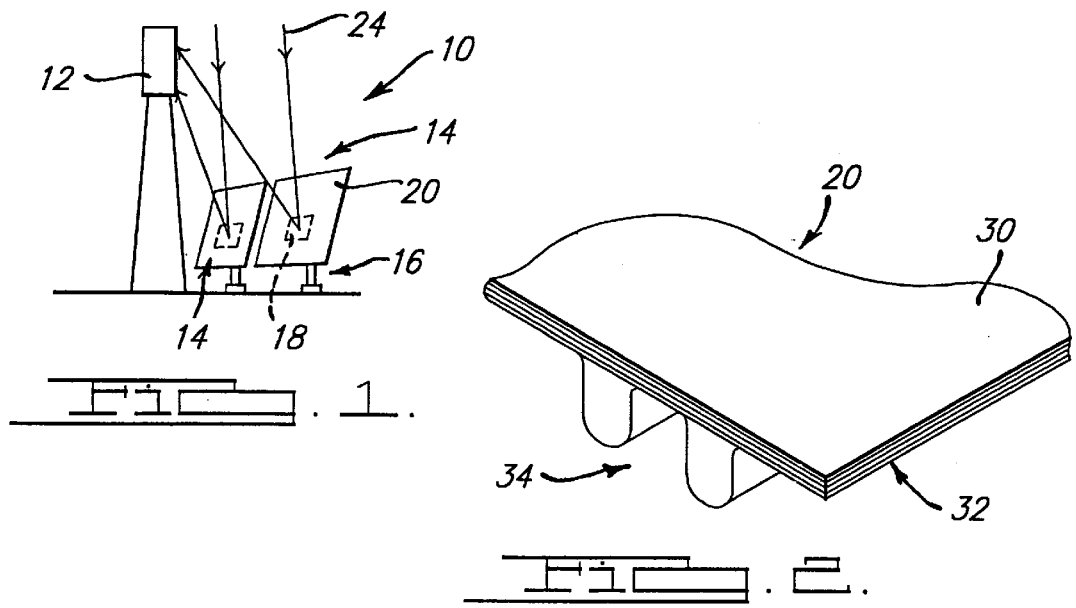
FIG. 1.
FIG. 2.
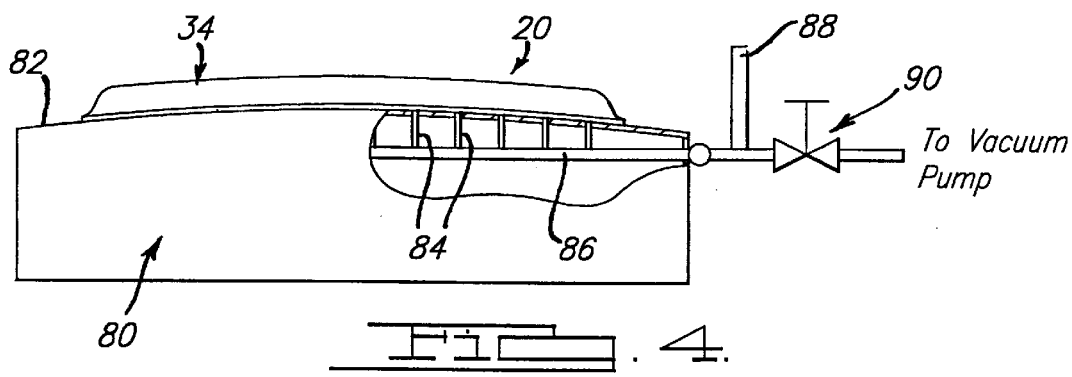
FIG. 4.
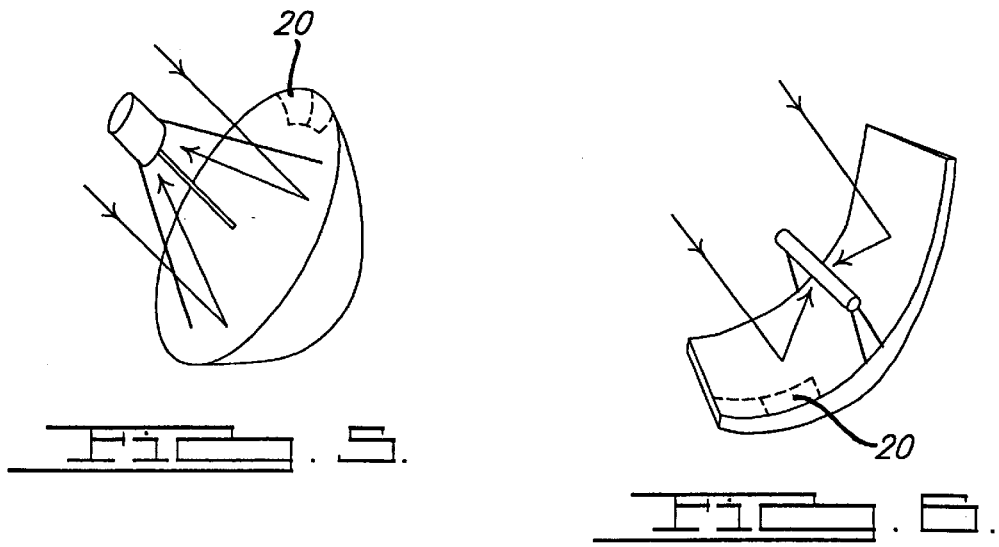
FIG. 5.
FIG. 6.

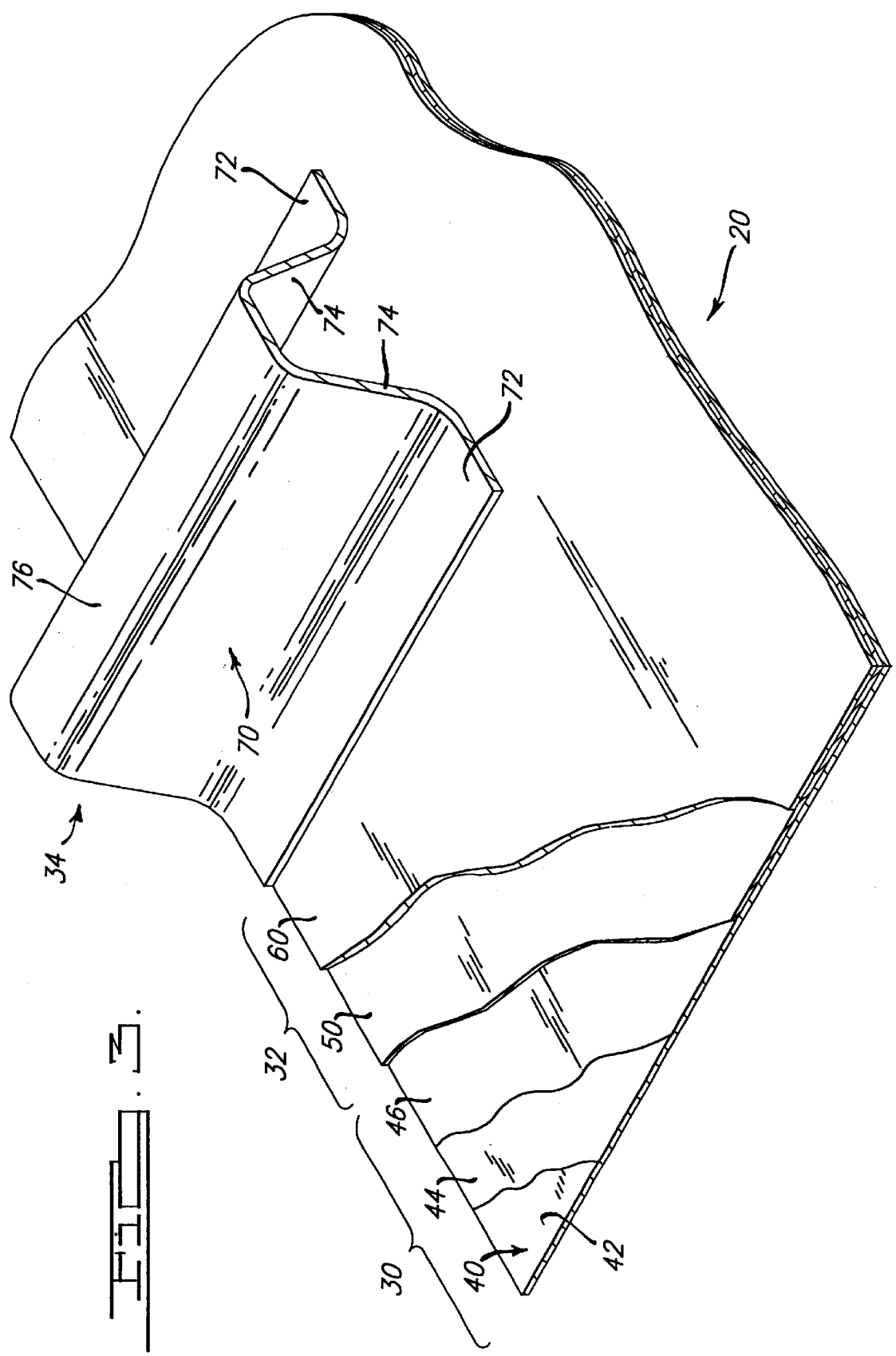

COMPOSITE BACKED PRESTRESSED MIRROR FOR SOLAR FACET

TECHNICAL FIELD

The present invention relates generally to the construction of mirrors and more particularly relates to a prestressed mirror and a method for fabricating the same.

BACKGROUND OF THE INVENTION

BACKGROUND ART

High concentration solar thermal power systems typically rely on a field of heliostats, or a parabolic dish or trough concentrators to track the sun and reflect solar radiation to a receiver where the solar energy heats a working fluid, such as steam. The working fluid is then employed to provide thermal energy for various industrial and commercial processes or to produce electricity. Similarly, concentrating photovoltaic systems use mirrors of varying types to collect solar energy where it is turned directly into electrical energy.

In such systems, it is critical for performance objectives that the mirror facets which make up these systems meet stringent optical performance characteristics such as radius of curvature, reflectivity and surface slope error. It is also critical that these mirror facets be lightweight so as to reduce the cost associated with the drive units that are needed to aim the mirror facets. The mirror facets must also be sufficiently robust to ensure a long life despite their exposure to precipitation, wind and sun. Consequently, these mirror facets must be capable of withstanding sustained winds in excess of 100 m.p.h., temperatures ranging from -40° F. to 130° F., impacts from hail, corrosive elements (e.g., acid rain, salt), humidity changes, etc. Furthermore, as there may be hundreds or even thousands of mirror facets in a system, it is highly desirable that the mirror facet be of highly cost efficient construction.

The designs of conventional mirror facets have relied on the thickness of the glass that forms the mirror facet and/or the frame structure of the mirror facet to compensate for the relatively weak tensile properties of glass. This approach has several drawbacks, including losses in reflectivity as a result of the use of relatively thicker glass and a relatively higher weight. Additionally, these mirror facets are not as robust as desired, being highly susceptible to damage during shipping, installation and use. Furthermore, as these mirror facets have relatively weak tensile properties, their exposure to time-varying forces such as wind can cause the propagation of cracks which could permit the reflective finish of the mirror facet to corrode, with the result being impaired performance of the mirror facet.

In view of these drawbacks, some conventional mirror facets have obtained additional strength through the use of operations: such as slumping, chemical strengthening, annealing and/or tempering. These processes tend to be relatively expensive, and as such, a substantial cost penalty is incurred if these processes are employed. Furthermore, these mirror facets typically rely on relatively thicker glass and as such are accompanied by drawbacks such as losses in reflectivity and higher weight.

SUMMARY OF THE INVENTION

It is one object of the present invention to provide a glass structure which is robust yet light in weight and relatively inexpensive to manufacture.

It is another object of the present invention to provide a glass structure which is robust yet utilizes a relatively thin glass member.

It is yet another object of the present invention to provide a glass structure which employs a structure that applies a compressive force to a glass member to place the glass member in compression as to improve the strength of the glass structure.

It is a further object of the present invention to provide a glass structure which employs a relatively lightweight reinforcing member that does not affect the surface slope error of the glass structure.

It is yet another object of the present invention to provide a method for forming a glass structure.

In one preferred form, the present invention provides a glass structure having a glass member, a composite structure and a support structure. The composite structure includes a rigid interlayer which is bonded to the glass member and exerts a compressive force thereon to place the glass member in compression. The support structure is used to mount the glass structure and prevents the glass member from collapsing due to the compressive force exerted by the rigid interlayer.

In another preferred form, the present invention provides a method for forming a glass structure comprising the steps of providing a glass member and securing a rigid interlayer to the glass member such that the rigid interlayer applies a compressive force to the glass member.

BRIEF DESCRIPTION OF THE DRAWINGS

Additional advantages and features of the present invention will become apparent from the subsequent description and the appended claims, taken in conjunction with the accompanying drawings, wherein:

FIG. 1 is a schematic illustration of a heliostat-type solar power system having a plurality of glass structures each constructed in accordance with a preferred embodiment of the present invention;

FIG. 2 is a perspective view of a portion of the glass structure of FIG. 1;

FIG. 3 is an enlarged perspective view of the glass structure of FIG. 1;

FIG. 4 is a schematic view of the glass structure of FIG. 1 being fabricated on a vacuum tool;

FIG. 5 is a schematic illustration similar to that of FIG. 1 but showing a parabolic dish configuration; and FIG. 6 is a schematic illustration similar to that of FIG. 1 but showing a parabolic trough configuration.

DETAILED DESCRIPTION OF THE PREFERRED EMBODIMENT

With reference to FIG. 1 of the drawings, an illustrative solar power system is generally indicated by reference numeral 10. Solar power system 10 is shown to include an elevated receiver 12 and a plurality of heliostats 14. Each of the heliostats 14 has a base structure 16 and a drive mechanism 18, as well as a glass structure 20 that is constructed according to a preferred embodiment of the present invention. Base structure 16 and drive mechanism 18 are conventional in their construction and operation and as such, need not be discussed in detail. Briefly, base structure 16 supports drive mechanism 18 and glass structure 20. Drive mechanism 18 selectively orients glass structure 20 in a predetermined manner such that incident rays of solar energy 24 are reflected to receiver 12. Accordingly, drive mechanism 18 operates to change the position (e.g., angularity) of glass structure 20 to track the position of the sun.

With additional reference to FIGS. 2 and 3, glass structure 20 is shown to include a glass member 30, a composite structure 32 and a support structure 34. Glass member 30 preferably includes a relatively thin glass panel 40 having a thickness of about 0.001 inches to about 0.4 inches. The rear side 42 of glass panel 40 is coated with a reflective material 44, such as silver, a topcoat 46, such as copper, and mirror backing paint.

Composite structure 32 includes a rigid interlayer 50 that is bonded to and applies a compressive force to glass member 30. Rigid interlayer.50 may be formed from a resin such as an unsaturated polyester, a bismaleimide (BMI), an epoxy vinyl ester or another epoxy, which is applied to the rear side of glass member 30 while in a liquid state by any practical means, including brushing, curtain coating, spraying and/or extrusion. The resin is then cured to increase the thickness of the assembly (i.e., the glass member 30 and the rigid interlayer 50) to provide increased durability. It should be noted that deformation of the assembly due to stress loads is reduced as the thickness of the assembly is increased, with the deformation being approximately inversely proportional to the cube of the thickness of the assembly. Thus, incorporation of rigid interlayer 50 into glass structure 20 limits the deformation of glass structure 20 even where a relatively thin glass member 30 is used. This permits the thickness of glass member 30 to be reduced so as to improve the reflectivity of glass structure 20. Besides increasing the thickness and relative stiffness of glass structure 20, rigid interlayer 50 also applies a compressive force to glass member 30. In the particular embodiment illustrated, the resin forming rigid interlayer 50 shrinks as it cures, thus applying a compressive force to glass member 30. Inorganic filler materials, such as calcium carbonate, may be incorporated into the liquid resin to control the shrinkage of the rigid interlayer while it is being cured.

In the example provided, composite structure 32 is also shown to include a reinforcing member 60 which further increases the thickness of glass structure 20 and its resistance to deformation. In the particular embodiment shown, reinforcing member 60 is a polymeric matrix composite containing a woven fiberglass mat reinforcement. The fiberglass mat reinforcement is initially saturated in liquid resin and subsequently placed onto rigid interlayer 50. The resin in preferably the same resin used to form rigid interlayer 50 (i.e., an unsaturated polyester, a bismaleimide (BMI), an epoxy vinyl ester or another epoxy).

Support structure 34 is placed onto the fiberglass matting while the resin is still wet. Support structure 34 is adapted for use in mounting glass structure 20 to base structure 16 and spreading loads transmitted between glass structure 20 and base structure 16 over a relatively large area. Support structure 34 may be made from any structural material in any appropriate structural shape. Support structure 34 is preferably fabricated from a high-strength, low-cost and low-weight material such as fiberglass. Alternatively, support structure 34 may be fabricated from a metallic material such as steel or aluminum. In the particular embodiment illustrated, support structure 34 includes a plurality of hat-shaped beam sections 70, with each section 70 being formed from a continuous strip to include a pair of flanges 72, a pair of upwardly directed wall members 74 and a generally flat mount 76 as shown best in FIG. 3. Curing of the resin in reinforcing member 60 bonds the flanges of the support structure 34 to composite structure 32 and causes reinforcing member 60 to apply an additional compressive force to glass member 30.

In FIG. 4, a tool for fabricating glass structure 20 is generally indicated by reference numeral 80. Tool 80 is shown to have a contoured surface 82 through which a plurality of feed holes 84 have been drilled. The feed holes 84 terminate at a central manifold 86, which is coupled to a pressure gauge 88 and a shut-off valve 90. Glass member 30 is initially placed on the contoured surface 82 of tool 80 such that the transparent surface of glass member 30 is in contact with the contoured surface 82. A vacuum is applied through valve 90 to the central manifold 86, causing glass member 30 to sealingly contact the contoured surface 82. This places the front surface of the glass member 30 in compression and the rear surface in tension. Vacuum pressure is maintained through the valve 90 by a conventional vacuum source, such as a vacuum pump, to ensure maintenance of the desired contour during the entire fabrication process. Those skilled in the art will understand that the magnitude of the vacuum may be maintained at a predetermined level throughout the fabrication process or may be varied, depending on a number of factors that are particular to a specific application and need not be detailed herein. Vacuum gauge 88 is used to ensure the proper vacuum level is maintained.

Contoured surface 82 is fabricated to a predetermined shape that takes into account the compressive forces that are developed through the curing of resin, as well as the spring-like nature of the components of the glass structure 20 which cause the glass structure 20 to relax somewhat after it is removed from the tool. Resin which forms rigid interlayer 50 is next applied to the rear surface of glass member 30 and cured. As mentioned above, the rear surface of glass member 30 is initially in tension. However, as the resin shrinks when it cures, it generates a compressive force which is applied to the rear surface of glass member 30. The compressive force is of sufficient magnitude to place all of glass member 30 (i.e., both the front and rear surfaces) in compression. It should be noted that the resin is preferably cured at a temperature that is greater than or equal to the maximum operating temperature of the glass structure 20 (i.e., the curing temperature should meet or exceed the maximum temperature that the glass structure 20 will be exposed to during its operation) so as to prevent the resin from permanently changing dimensionally during the use of the glass structure 20 or decreasing the desired compressive force by expansion of the resin which forms rigid interlayer 50 relative to glass member 30 by shrinkage of the resin which forms rigid interlayer 50 and shrinkage of the composite material 60 relative to the glass member 30.

After rigid interlayer 50 has cured, reinforcing member 60 is applied to rigid interlayer 50. Support structure 34 is then positioned onto reinforcing member 60 such that the flanges 72 contact the resin. The liquid resin is then cured at an elevated temperature as discussed in the immediately preceding paragraph which details the formation of the rigid interlayer 50. Support structure 34 is bonded to reinforcing member 60 as the resin forming reinforcing member 60 cures to thereby provide structural support for glass member 30. Once the curing of the reinforcing member 60 is complete, the vacuum in central manifold 86 is released to permit glass structure 20 to be removed from tool 80. As mentioned above, support structure 34 provides structural support to glass structure 20 and prevents the residual compressive forces from collapsing the glass member 30.

It is important to note that rigid interlayer 50 provides a uniform and continuous surface for the mounting of glass member 30. In contrast, if glass member 30 were to be mounted directly to reinforcing member 60, the small voids between the reinforcing fibers would leave the glass member 30 unsupported in the area of the void, thereby permitting the glass member 30 to dimple in response to the compressive forces that are developed when the resin cures. Accordingly, in a glass structure constructed in this manner (i.e. without rigid interlayer 50), the surface of the glass structure obtains an orange peel-like texture which tends to increase the surface slope error of the glass structure, resulting in a substantial decrease in the power delivered to receiver 12.

While the glass structure 20 has been described thus far as being employed in a heliostat, those skilled in the art will appreciate that the invention, in its broader aspects, may be constructed somewhat differently. For example, the glass structure may form a single facet of a relatively large heliostat, or a single facet of a parabolic dish concentrator (FIG. 5) or a parabolic trough concentrator (FIG. 6). Accordingly, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A glass structure suitable for use in collecting and reflecting thermal energy in a solar power system, the glass structure comprising:
   a glass member having a front surface and a rear surface, the glass member being formed such that the rear surface is at least partially arcuately shaped, wherein formation of the glass member places the rear surface in a state of tension; and
   resin means applied to the rear surface of the glass member, the resin means curing to form a rigid interlayer that applies a compressive force to the glass member so that both the front and rear surfaces of the glass member are maintained in a state of compression.

2. The glass structure of claim 1, wherein the resin means is selected from a group of resins consisting of unsaturated polyesters, bismaleimides, epoxy vinyl esters and epoxies.

3. The glass structure of claim 1, wherein the resin means includes an inorganic filler.

4. The glass structure of claim 1, further comprising a reinforcing structure that is coupled to the rigid interlayer.

5. The glass structure of claim 4, wherein the reinforcing structure includes a reinforcing member and a resin.

6. The glass structure of claim 5, wherein the reinforcing member is a woven fiberglass.

7. The glass structure of claim 5, wherein the resin is selected from a group of resins consisting of unsaturated polyesters, bismaleimides, epoxy vinyl esters and epoxies.

8. The glass structure of claim 5, further comprising a securing structure coupled to the reinforcing structure and adapted for use in mounting the glass structure.

9. The glass structure of claim 1, wherein the glass member includes a glass panel having a thickness of about 0.001 inch to about 0.4 inch.

10. The glass structure of claim 1, wherein the glass member is a mirror and the glass structure is a mirror facet.

11. The glass structure of claim 1, further comprising a securing structure coupled to the rigid interlayer and adapted for use in mounting the glass structure.

12. The glass structure of claim 11, wherein the securing structure is formed from a metallic material.

13. A glass assembly comprising:
    a glass structure with a planar front surface and a planar rear surface that is generally parallel to the front surface, the glass structure being deflected such that the front surface is in a state of compression and the rear surface is in a state of tension, the compression and tension occurring as a result of the deflection of the glass structure; and
    a liquid resin applied to the rear surface of the glass structure, the resin curing to form a rigid interlayer, the resin shrinking as it cures to generate a compressive force that is applied to the rear surface of the glass structure, the compressive force generated by the resin being of sufficient magnitude so as to place the rear surface of the glass structure into a state of compression.

14. The glass assembly of claim 13, wherein the liquid resin means is selected from a group of resins consisting of unsaturated polyesters, bismaleimides, epoxy vinyl esters and epoxies.

15. The glass assembly of claim 13, wherein the liquid resin means includes an inorganic filler.

16. The glass assembly of claim 13, further comprising a reinforcing structure that is coupled to the rigid interlayer.

17. The glass assembly of claim 13, wherein the reinforcing structure includes a reinforcing member and a resin.

18. The glass assembly of claim 17, wherein the reinforcing member is a woven fiberglass.

19. The glass assembly of claim 17, further comprising a securing structure coupled to the reinforcing structure and adapted for use in mounting the glass structure.

20. The glass assembly of claim 13, wherein the glass structure includes a glass panel having a thickness of about 0.001 inch to about 0.4 inch.

21. A glass assembly comprising:
    a glass structure with a front surface and a rear surface, the glass structure being deflected such that the front surface is axially contracted, which thereby places the front surface in a state of compression, and the rear surface is axially elongated, which thereby places the rear surface in a state of tension; and
    a resin applied to the rear surface of the glass structure, the resin curing to form a rigid interlayer that inhibits the glass structure from returning to an undeflected state, the resin shrinking as it cures and applying an axially directed force to the rear surface that counteracts the axial elongation of the rear surface and places the rear surface in a state of compression.

22. The glass assembly of claim 21, wherein the resin is selected from a group of resins consisting of unsaturated polyesters, bismaleimides, epoxy vinyl esters and epoxies.

23. The glass assembly of claim 21, wherein the resin includes an inorganic filler.

24. The glass assembly of claim 21, further comprising a reinforcing structure that is coupled to the rigid interlayer.

25. The glass assembly of claim 24, wherein the reinforcing structure includes a reinforcing member and a resin.

26. The glass assembly of claim 25, wherein the reinforcing member is a woven fiberglass.

27. The glass assembly of claim 25, further comprising a securing structure coupled to the reinforcing structure and adapted for use in mounting the glass structure.

28. The glass assembly of claim 21, wherein the glass structure includes a glass panel having a thickness of about 0.001 inch to about 0.4 inch.

29. A glass assembly comprising:

a glass structure with a front surface and a rear surface, the glass structure being deflected such that the front surface is axially contracted, which thereby places the front surface in a state of compression, and the rear surface is axially elongated, which thereby places the rear surface in a state of tension; and resin means bonded to the rear surface of the glass structure, the resin means forming a rigid interlayer that inhibits the glass structure from returning to an undeflected state, the resin means applying an axially directed compressive force to the rear surface of the glass structure that counteracts the axial elongation of the rear surface and places the rear surface in a state of compression.

* * * * *